United States Patent [19]
Sakamoto et al.

[11] Patent Number: 6,018,504
[45] Date of Patent: Jan. 25, 2000

[54] RECORDING DEVICE CAPABLE OF RECORDING BROADCAST SIGNALS AT A DESIRED TIME

[75] Inventors: Hiroshi Sakamoto, Chiba; Nobuaki Hisamatsu, Tokyo; Tomohiro Obita, Kanagawa; Takahiro Yamaguchi, Kanagawa; Yozo Tanaka, Kanagawa, all of Japan

[73] Assignee: Sony Corporation, Tokyo, Japan

[21] Appl. No.: 09/077,658

[22] PCT Filed: Oct. 8, 1997

[86] PCT No.: PCT/JP97/03624

§ 371 Date: Sep. 30, 1998

§ 102(e) Date: Sep. 30, 1998

[87] PCT Pub. No.: WO98/15955

PCT Pub. Date: Apr. 16, 1998

[30] Foreign Application Priority Data

Oct. 9, 1996 [JP] Japan .................................. 8/268943
Oct. 9, 1996 [JP] Japan .................................. 8/268944

[51] Int. Cl.⁷ .................................................. H04H 9/00
[52] U.S. Cl. ........................ 369/7; 455/181.1; 455/186.1; 455/37.1
[58] Field of Search ............................. 369/7, 6, 19, 20, 369/25; 455/32.1, 35.1, 37.1, 38.1, 181.1, 186.1, 182.1

[56] References Cited

U.S. PATENT DOCUMENTS

| | | | |
|---|---|---|---|
| 4,310,924 | 1/1982 | Miyasaka et al. | 455/181 |
| 4,403,344 | 9/1983 | Yamada et al. | 455/181.1 |
| 4,626,909 | 12/1986 | Oniki et al. | 358/114 |
| 4,969,209 | 11/1990 | Schwob | 455/158.4 |
| 5,101,508 | 3/1992 | Owaki | 455/158.2 |
| 5,195,134 | 3/1993 | Inoue | 380/20 |
| 5,448,534 | 9/1995 | Okada | 369/7 |
| 5,465,403 | 11/1995 | Owaki | 455/186.1 |
| 5,568,453 | 10/1996 | Okada | 369/7 |
| 5,862,104 | 1/1999 | Matsumoto | 369/7 |

FOREIGN PATENT DOCUMENTS

| | | |
|---|---|---|
| 63-298869 | 12/1988 | Japan . |
| 6-162734 | 6/1994 | Japan . |
| 8-22665 | 1/1996 | Japan . |
| 8-31157 | 2/1996 | Japan . |
| 8-180656 | 7/1996 | Japan . |

*Primary Examiner*—Tan Dinh
*Attorney, Agent, or Firm*—Limbach & Limbach L.L.P.

[57] ABSTRACT

A recording apparatus includes a tuner, a storage unit for holding on memory the timer information concerning at least the broadcast reception start time and the broadcast reception end time by the tuner, a timer, a recording unit for effecting recording on a recording medium taken out from a housing section holding a plurality of recording mediums and a controller for controlling the operation of the tuner and the recording unit based on an output signal from the timer and the timer information stored in the storage unit. The controller compares the output signal from the timer and the broadcast reception start time of the timer information held on memory in the storage unit, causes the recording unit to start recording of an output signal from the tuner on the recording medium thus taken out and causes the recoding unit to terminate the recording operation for the output signal from the tuner by the recording unit based on the results of comparison of the output signal of the timer and the broadcast reception end time of the timer information held on memory in the storage unit.

28 Claims, 9 Drawing Sheets

RECORDING DEVICE CAPABLE OF RECORDING BROADCAST SIGNALS AT A DESIRED TIME

TECHNICAL FIELD

This invention relates to a recording apparatus for recording information signals, such as audio signals received by a tuner, on plural recording mediums, in particular plural disc-shaped recording medium.

BACKGROUND ART

As a medium for recording information signals, such as audio signals, an optical disc as a high-density recording medium, is becoming popular. This optical disc has a feature that it can be random-accessed and moreover is easy to handle because it is housed in a thin small-sized cartridge. This optical disc is classified into a re-recordable type capable of re-recording information signals, such as a magneto-optical disc or a phase-change optical disc, and a read-only type dedicated to reproduction, such as a so-called compact disc.

Since the re-recordable optical discs record information signals, such as audio signals, as digital signals, the playback sound of high sound quality can be produced, while editing or duplication can be done easily without substantially degrading the sound quality.

In a reproducing apparatus for the read-only compact disc, a variety of reproducing devices, having the medium exchange function of housing plural discs in a pre-set stocker and of taking out the discs in an optional sequence for continuous reproduction, have so far been presented to the market. However, only a few types of the recording devices adapted for recording on recordable optical discs and having the exchange function have been offered to the market.

The recording medium comprised of a recordable optical disc housed in a small-sized cartridge has the maximum recording time of the order of 74 min such that it cannot sufficiently meet the demand for recording a broadcast program of prolonged time duration. In particular, if desired to record information signals, such as audio signals, on plural disc-shaped recording mediums in succession, the disc-shaped recording mediums need to be sequentially inserted by manual operation into the recording device one-by-one for recording to render it extremely difficult to realize continuous recording for a prolonged time duration.

If the user records on a recording medium being used, there are occasions wherein crucial information signals not desirable to be erased have been recorded on the disc. It is therefore desirable that recording be made in a non-recorded area of the recording medium without erasing the pre-recording area.

In the case of a recording device in which information signals, such as audio signals, as the plural recordable recording mediums, such as optical discs, are exchanged, it is desirable not only to designate the medium by a manual operation, but also to exchange the mediums automatically by control signals in the course of recording.

Also, in the case of appointing broadcast programs by a tuner/timer device, it would be convenient if plural broadcast programs are appointed and these appointed broadcast programs are allocated to respective different mediums to effect recording, since then the editing operation of recording the different broadcast programs on a sole medium and re-recoding the programs on respective separate recording mediums can be omitted.

DISCLOSURE OF THE INVENTION

It is an object of the present invention to overcome the above-described problems of the prior art and to provide a recording device in which plural recording mediums housed in cartridges in pre-set housing sections and in which recording is made sequentially on the recording mediums to make possible substantially continuous long-time recording.

It is another object of the present invention to provide a recording device in which a desired one of the plural housed recording mediums can be selected and recorded when information signals, such as audio signals, are entered to the device.

In one aspect, the present invention provides a recording apparatus includes a tuner, a storage unit for holding on memory the timer information concerning at least the broadcast reception start time and the broadcast reception end time by the tuner, a timer, a recording unit for effecting recording on a recording medium taken out from a housing section holding a plurality of recording mediums and a controller for controlling the operation of the tuner and the recording unit based on an output signal from the timer and the timer information stored in the storage unit. The controller compares the output signal from the timer and the broadcast reception start time of the timer information held on memory in the storage unit, causes the recording unit to start recording of an output signal from the tuner on the recording medium thus taken out and causes the recording unit to terminate the recording operation for the output signal from the tuner by the recording unit based on the results of comparison of the output signal of the timer and the broadcast reception end time of the timer information held on memory in the storage unit.

The controller judges whether or not signals are already recorded on a recording medium taken out from the housing section and controls the recording start position of the output signal from the tuner on the recording medium by the recording unit.

If the controller judges that signals are already recorded on the recording medium taken out from the housing section, the controller causes the recording unit to record an output signal from the tuner as from the recording end position of the previous recording on the recording medium taken out from the recording section.

If the controller judges that signals are not already recorded on the recording medium taken out from the housing section, the controller causes the recording unit to record an output signal from the tuner as from the recording start position of the previous recording on the recording medium.

After the end of recording of the output signal from the tuner on the recording medium taken out from the housing section, the controller causes the recording mediums held in the housing section to be sequentially taken out to cause the recording unit to continue the recording operation thereon.

The housing section has a plurality of housing sites in which to hold the plural recording mediums and the apparatus includes a detection unit for detecting on which of the housing sites of the housing section the recording medium are held. The controller controls the recording operation of the recording unit based on the results of detection by the detection unit.

The recording apparatus further includes a transporting unit for taking out a recording medium from the housing section to transport it to the recording unit, the controller controlling the operation of the transporting unit based on the results of detection from the detection unit.

The storage unit holds on memory the timer information concerning the broadcast reception start time and the broadcast reception end time by a plurality of the tuners and a plurality of items of the reception information concerning the broadcasting stations received by the tuners. The storage section also holds on memory the medium information as to on which of the recording mediums housed in the housing section the broadcast received by the tuner is to be recorded. The controller controls the tuner by the reception information read out from the storage unit, the controller causing the recording medium designated by the medium information to be taken out from the housing section to record the output signal from the tuner on the recording medium taken out from the housing section.

In another aspect, the present invention provides a recording apparatus for a recording medium having a first recording area in which to record signals and a second recording area in which to record the table-of-contents information concerning the signals recorded in the fist signal recording area, in which the apparatus includes a tuner, a storage unit for holding on memory the timer information concerning at least the broadcast reception start time and the broadcast reception end time by the tuner, a timer, a recording unit for recording an output signal from the tuner on a recording medium taken out from a housing section holding a plurality of recording mediums and a controller for controlling the operation of the tuner and the recording unit based on an output signal from the timer and the timer information stored in the storage unit. The controller controls the reception operation of the tuner based on the reception information from the storage unit and compares the output signal from the timer to the broadcast reception start timing of the timer information held on memory in the storage unit. The controller causes a sole recording medium to be taken out from the housing unit based on the results of comparison. The controller also causes the recording unit to start recording the output signal of the tuner in a vacant recording area in the first recording area of the recording medium taken out from the housing unit, while also causing the recording unit to terminate recording of the output signal of the tuner based on the results of comparison of the timer output signal to the broadcast reception end time in the storage unit.

The controller judges whether signals are already recorded on the recording medium taken out from the housing unit based on the table-of-contents information recorded in the second recording area of the recording medium taken out from the housing unit. The controller controls the recording start position of the output signal from the tuner on the recording medium by the recording unit based on the results of judgment.

Other objects and advantages of the present invention will become more apparent from the following description of the referred embodiments.

BEST MODE FOR CARRYING OUT THE INVENTION

Referring to the drawings, a recording device of the present invention will be explained in detail.

Figure 1:
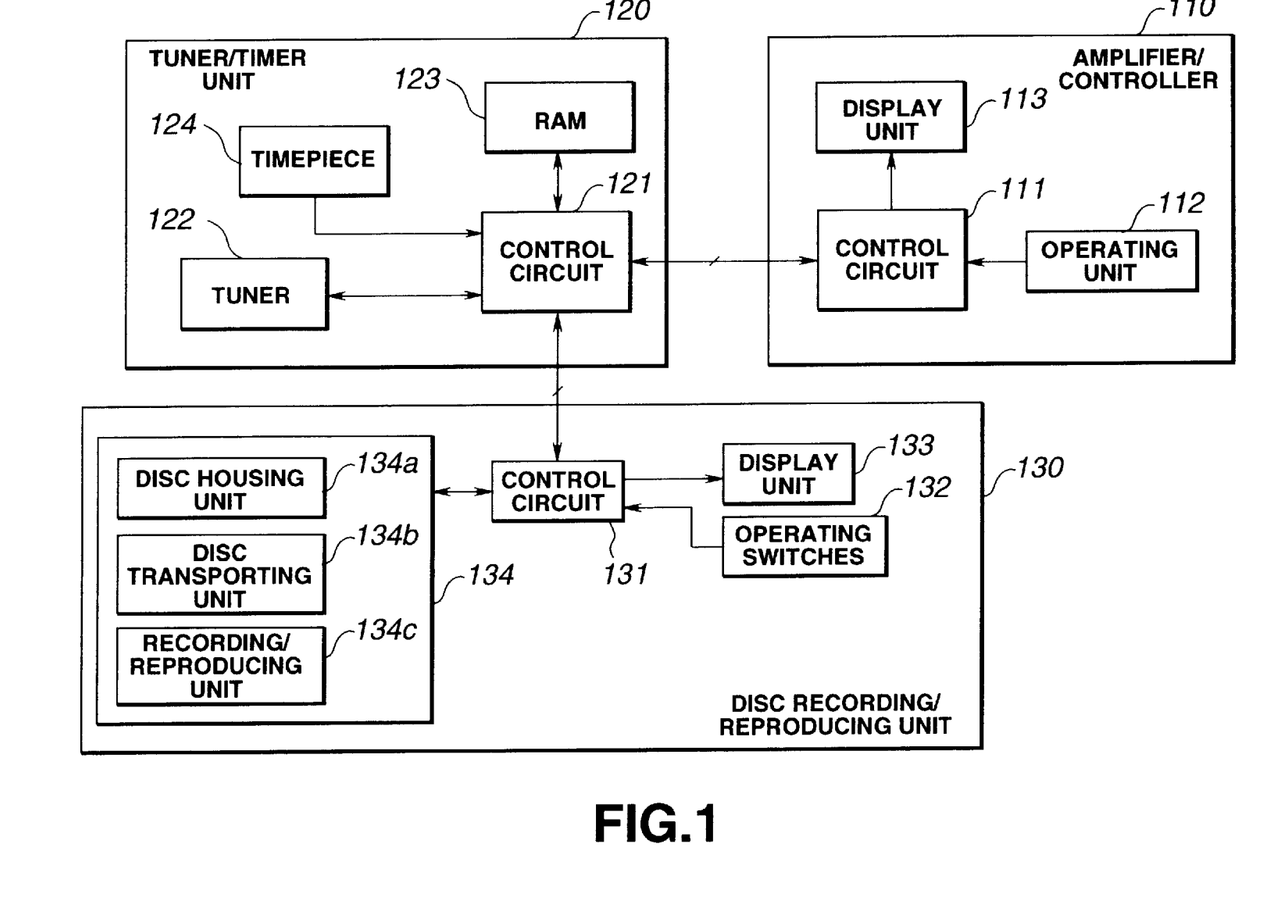
FIG. 1 is a block diagram showing an example of a disc recording and/or reproducing device according to the present invention.

The disc recording and/or reproducing apparatus, employing a recording device according to the present invention, is made up of an amplifier/controller 110, a tuner/timer unit 120 and a disc recording/reproducing unit 130, as shown in FIG. 1. The respective units exchange the control information of various sorts over a bus line.

The amplifier/controller 110 includes means for furnishing power to the entire recording and/or reproducing apparatus and for controlling the apparatus. The amplifier/controller 10 also includes a function of amplifying information signals such as audio signals, outputted by the tuner/timer unit 120 and the disc recording and/or reproducing unit 130 for supplying the amplified signals to a speaker, not shown. This amplifier/controller 10 includes a control circuit 111, as means for exchanging the control signals over a bus line with various portions of the disc recording and/or reproducing apparatus and for controlling the apparatus in its entirety, an operating unit 112 having switches, dials or the like for commanding and entering the operations as later explained to the control circuit 111 and a display unit 113 made up of a liquid crystal display for displaying the operating states of various parts of the apparatus based on the information from the control circuit 111.

The tuner/timer unit 120 has the function of furnishing the information signals, such as audio signals obtained on reception and demodulation of a broadcast program, to the disc recording/reproducing unit 130, and the function of holding on memory the sequence of the broadcast program entered and set by the operating unit 112 of the amplifier/controller 110 by timer recording. This tuner/timer unit 120 is made up of a control circuit 121, a tuner 122, a random access memory (RAM) 123 and a timepiece unit 124. The control circuit 121 controls the operation of the tuner/timer unit 120 as it exchanges the control signals over the bus line with the various components of the disc recording and/or reproducing apparatus. The tuner 122 receives the broadcast program. The RAM 123 holds on memory the timer program recording information such as reception frequency for receiving the program by timer recoding, while the timepiece unit 124 generates the time information. The control circuit 121 controls the reception operation of the tuner 122 based on timer recording information held on memory by the RAM 123 and the time information from the timepiece unit 124 to select the station to receive the information signals such as audio signals of the desired broadcast program.

The disc recording/reproducing unit 130 has the function of recording/reproducing the information signals such as audio signals on or from plural optical discs. This disc recording/reproducing unit 130 is made up of a control circuit 131, a set of operating switches 132, a display unit 133 and a disc exchange and recording/reproducing unit 134. The control circuit 131 exchanges the control signals over a bus line with various portions of the disc recording and/or reproducing apparatus in controlling the apparatus in its entirety. The set of operating switches 132 has switches and dials for commanding the operations for the control circuit 131. The display unit 133 includes a liquid crystal display for displaying the operating states of various portions of the apparatus based on the information from the control circuit 131, while the disc exchange and recording/reproducing unit 134 records/reproduces the information signals such as audio signals on or from the plural optical discs. The disc exchange and recording/reproducing unit 134 is made up of a disc housing unit 134*a* for housing plural optical discs on which to record information signals, a disc transporting unit 134*b* and a recording/reproducing unit 134*c*. The disc transporting unit 134*b* serves as means for loading and clamping the disc housed in the disc housing unit 134*a* and for unloading the clamped disc based on control by the control circuit 131, while the recording/reproducing unit 134*c* is adapted for recording/reproducing information signals on or from the disc transported and clamped by the spindle.

The amplifier/controller 110, tuner/timer unit 120 and the disc recording/reproducing unit 130 may be of a so-called component stereo system composed of separate units housed in independent casings, or of a unitary structure composed of the various units housed in a sole casing.

Figure 2:
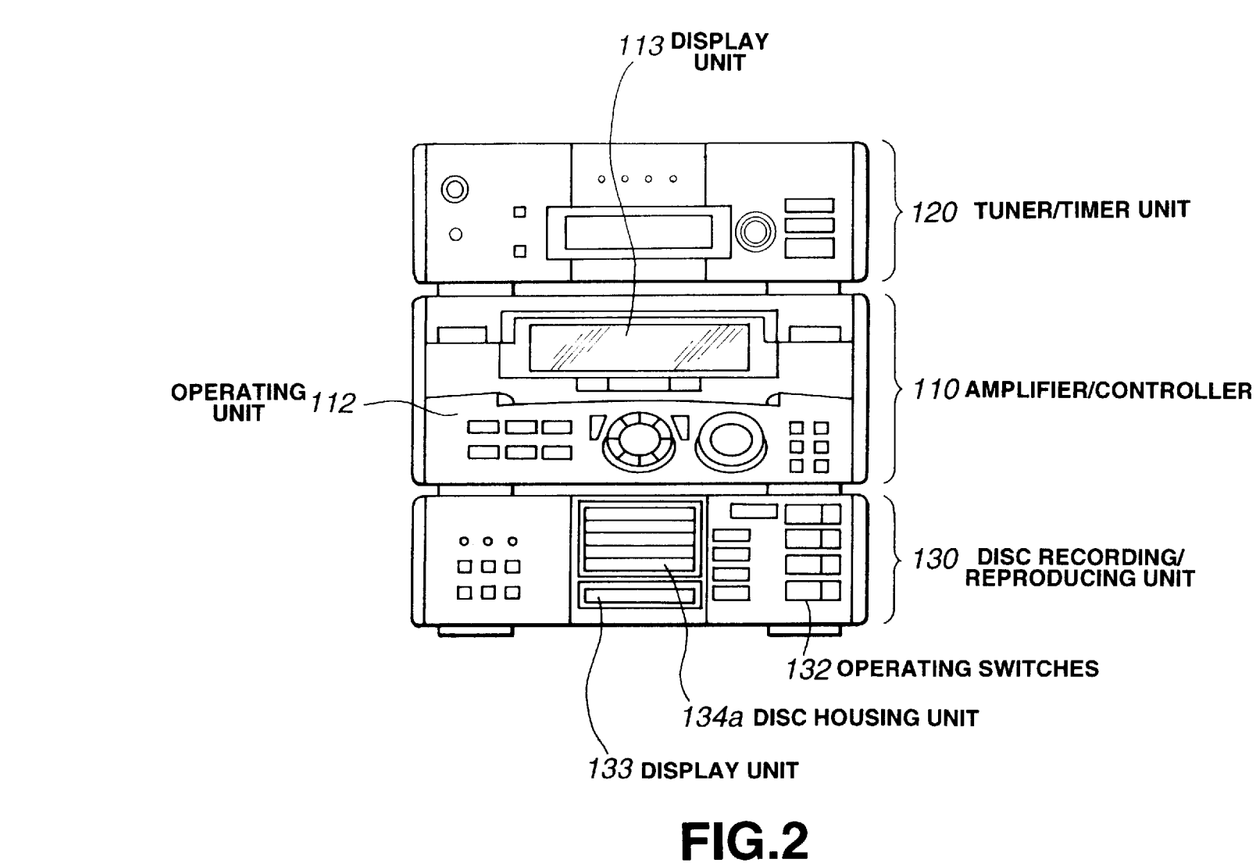
FIG. 2 is a front view showing the disc recording and/or reproducing device in its entirety and an example of an actuating unit.

FIG. 2 shows the entire disc recording and/or reproducing apparatus shown in FIG. 1.

Here, a structure is shown which is comprised of the components shown in FIG. 1 housed in separate casings. Looking from the top of the drawing, there are shown the tuner/timer unit 120 amplifier/controller 110 and the disc recording/reproducing unit 130.

The amplifier/controller 110 has, in its inside, a control circuit 111 for controlling the tuner/timer unit 120 and the disc recording and/or reproducing unit 130, as described above. The amplifier/controller 110 includes the operating unit 112, having various dials or keys for making various inputs to the control circuit 111 and the display unit 113 having a large-sized liquid crystal panel for displaying the operation of the entire disc recording and/or reproducing apparatus via the control circuit 111.

FIGS. 3*a* to 3*f* show a display example on the display unit 113.

The setting sequence for receiving the broadcast program by timer recording in the above-described disc recording and/or reproducing apparatus and for recording the received broadcast program is explained with reference to FIGS. 3*a* to 3*f*.

Figure 3A:
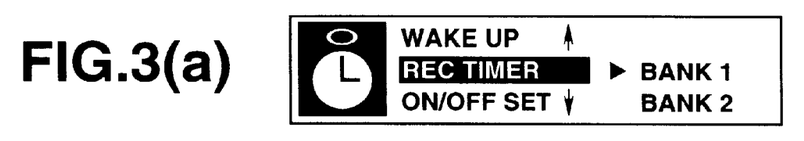
FIGS. 3a to 3f are front views showing a disc recording/reproducing unit of the disc recording and/or reproducing device in its entirety and an example of an actuating unit.

For receiving the broadcast program in timer recording, the user first turns a selector (SELECTOR) dial for selecting various menus of the operating unit 112 to select a rec timer (REC TIMER) mode. The user then presses an enter/next (ENTER/NEXT) key to establish the selected rec timer mode. FIG. 3*a* shows a display example showing the setting state of the rec timer mode.

Figure 3B:
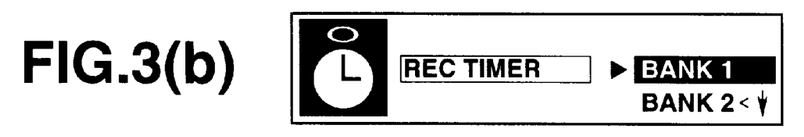

The user then turns the select dial to select a bank (BANK) which is a file for holding various settings for timer recording on memory and presses the enter/next key to establish the selected bank. FIG. 3*b* shows a display example indicating that a bank 1 has been selected as this bank.

Figure 3C:
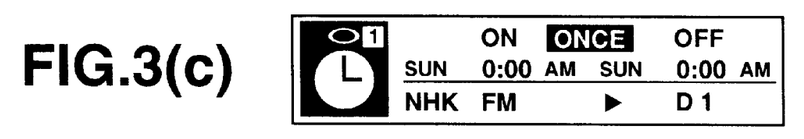

The user then turns the selector dial to select one of 'Once (ONCE)' or 'Weekly (WEEKLY)' which is not shown. 'Once' is the setting for receiving the broadcast program for timer recording only once while 'Weekly' is the setting for receiving the broadcast program for timer recording at the designated time of each designated day of the week every week. FIG. 3*c* shows a display example in which 'Once' is selected for setting for reception of receiving the broadcast program for timer recording only once.

Figure 3D:
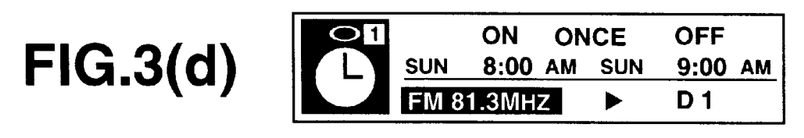

Similarly, the select dial is turned after setting the start/end time in timer recording, and subsequently the select dial is turned for setting (pre-setting) a broadcasting station desired to be received by the timer recording. FIG. 3*d* shows a display example for setting for selecting a broadcasting station making a FM broadcasting since 8 a.m. of Sunday until 9 a.m. of the same day with a frequency of 81.3 MHz.

Figure 3E:
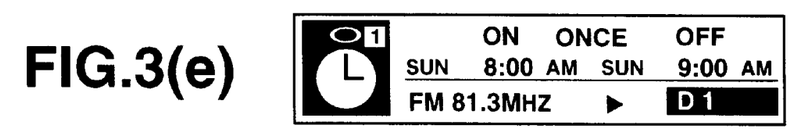
Figure 3F:
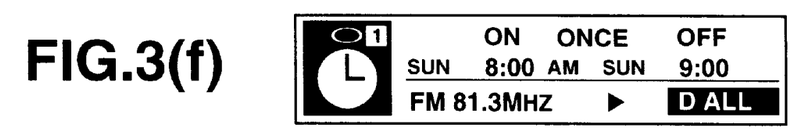

The user then turns the selector dial for selecting the equipment for recording, for example, a cassette tape recorder or a disc recording device. FIG. 3*e* shows a recording example (D1) showing a setting for selecting the disc recording device as a recording equipment and for making recording on a sole disc housed in the recording device. FIG. 3*f* shows a recording example (D ALL) showing a setting for selecting the disc recording device as a recording equipment and for receiving the broadcast program for timer recording for setting recording on all discs housed in the disc device.

By the above sequence of operations, the setting is made for receiving broadcast programs by timer recording in the disc recording and/or reproducing apparatus for recording the received programs. The set data are stored in a RAM 123. In a display example of the display unit 113 of the present disc recording and/or reproducing apparatus, display is changed to inverted display on menu selection or establishment to indicate the fact of establishment.

Before proceeding to detailed description of the disc recording and/or reproducing apparatus of the present invention, a magneto-optical disc as an example of the recording medium used therefor is explained.

Figure 4A:
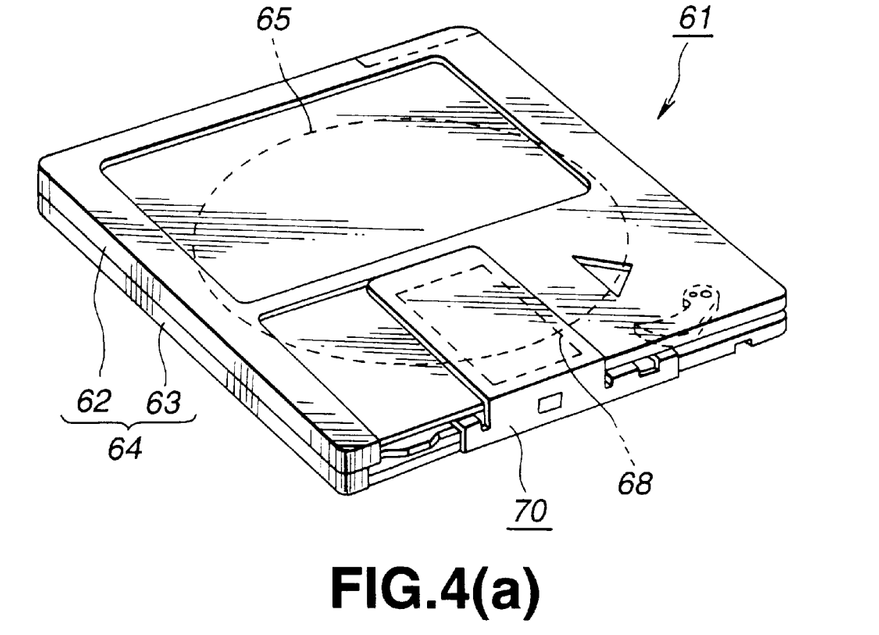
FIG. 4a is a perspective view showing a disc cartridge used in the disc recording and/or reproducing device from above and FIG. 4b is a perspective view showing the disc cartridge from below.
Figure 4B:
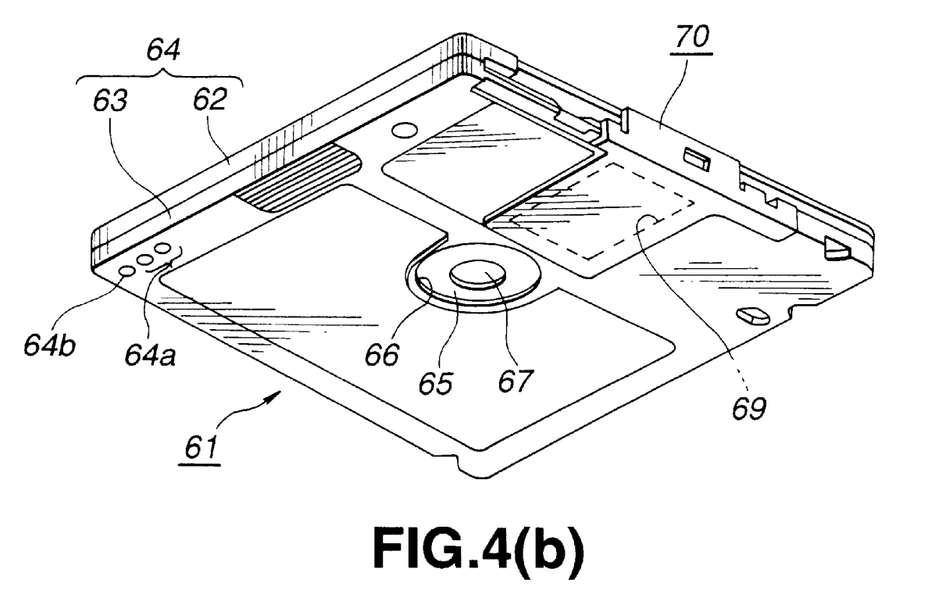

FIGS. 4*a* and 4*b* illustrate a disc cartridge holding a magneto-optical disc. Specifically, FIG. 4*a* is a perspective view of the disc cartridge looking from above and FIG. 4*b* is a perspective view of the disc cartridge looking from below.

The disc cartridge 61 is comprised of a main cartridge body portion 64, and a magneto-optical disc 65, as a recording medium for information signals housed within the main cartridge body portion 64. The main cartridge body portion 64 is made up of a rectangular-shaped upper half 62 and a similarly rectangular-shaped lower half 63, melded from synthetic resin and connected to each other.

The magneto-optical disc 65 is approximately 64 mm in diameter and has a recording capacity capable of recording audio signals up to a maximum of 74 minutes. The magneto-optical disc 65 includes a first signal recording area for recording information signals, such as audio signals, and a second signal recording area for recording table-of-contents information, such as the information recording start and stop positions or the name of the musical numbers recorded in the first signal recording area. The magneto-optical disc 6 also carries the address information formed by wobbling of a pre-groove radially of the disc.

The lower half 63 of the main cartridge body portion 64 includes a disc table entrance opening 66 into which is intruded a disc table of a disc rotating/driving unit adapted for rotationally driving the magneto-optical disc 65 when the disc cartridge 61 is loaded on the disc recording and/or reproducing apparatus, as shown in FIG. 4b. Specifically, this disc table entrance opening 66 is configured for exposing to outside a center portion of the magneto-optical disc 65 including a disc-clamping metal plate 67 of a magnetic material mounted for covering a center hole of the magneto-optical disc 65 housed within the main cartridge body portion 64.

In the upper and lower surfaces of the main cartridge body portion 64, that is in the upper and lower halves 62, 63, there are formed information signal recording/reproducing apertures 68, 69 for exposing at least portions of the signal recording areas of the magneto-optical disc 65 housed therein to outside radially of the disc. These information signal recording/reproducing apertures 68, 69, rectangular in shape, are formed at a mid portion in the left-and-right direction of the main cartridge body portion 64 for extending from a position proximate to the disc table entrance opening 66 shown in FIG. 4b to the front end face of the main cartridge body portion 64.

The main cartridge body portion 64 includes a discriminating potion 64a for discriminating the type of the disc 65 housed in the main cartridge body portion 64 and a mistaken recording inhibiting potion 64b for specifying whether or not recording of the information signals can be made on the disc 65, as shown in FIG. 4b. With the mistaken recording inhibiting potion 64b, it is detected by a detection switch of a recording/reproducing unit 130 whether or not information signals can be recorded on the magneto-optical disc 65.

On the main cartridge body portion 64, configured as described above, a shutter member 70 for opening/closing the information signal recording/reproducing apertures 68, 69 is mounted such as by fitting on the front end face of the main cartridge body portion 64, as shown in FIGS. 4a and 4b.

Figure 5:
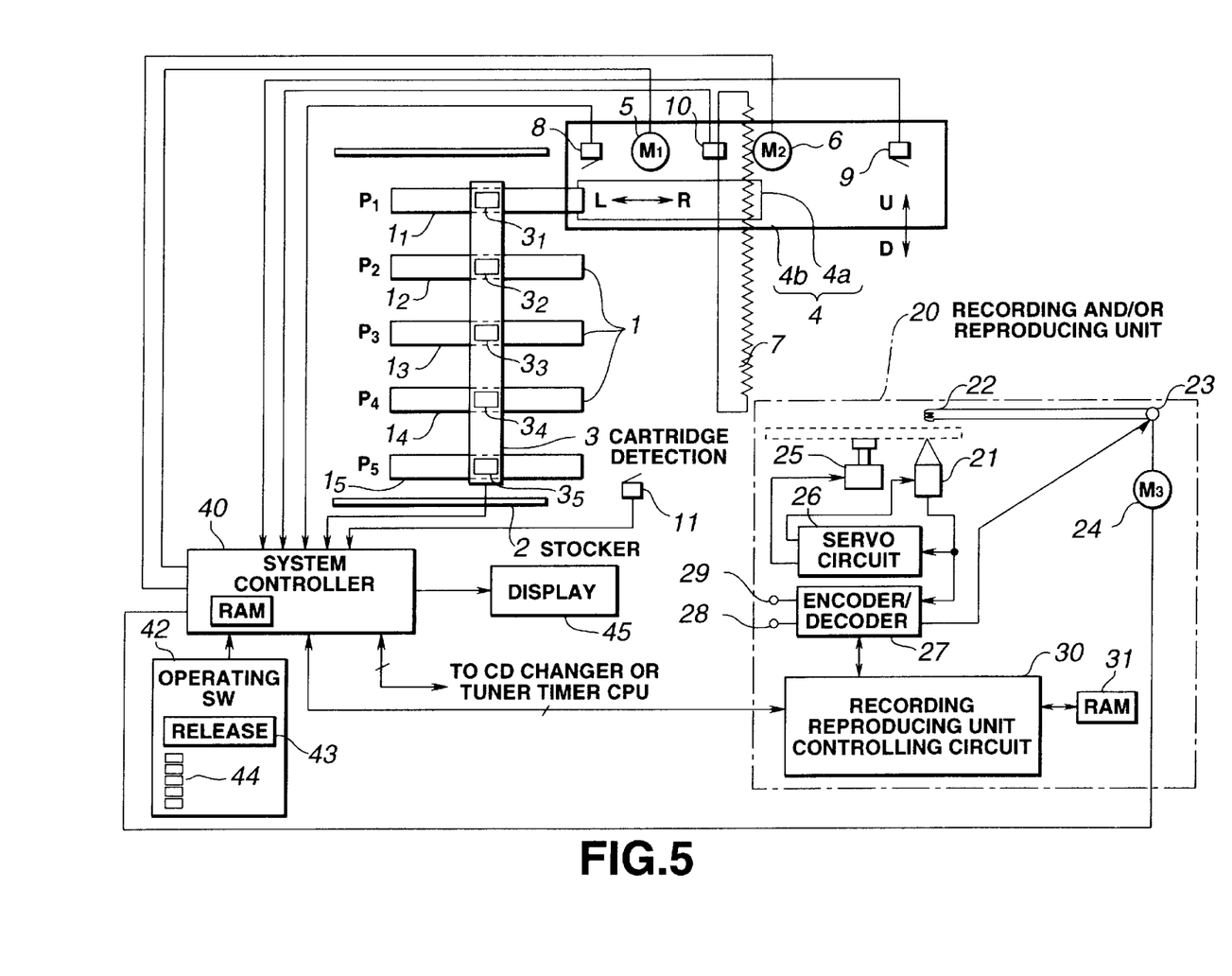
FIG. 5 is a block circuit diagram showing essential portions of the disc recording and/or reproducing device.

FIG. 5 shows essential portions of the disc recording and/or reproducing apparatus of FIG. 1 in more detail.

Referring to FIG. 5, this disc recording and/or reproducing apparatus includes a stocker 2 for housing up to a maximum of five disc cartridges $1_1$, $1_2$, $1_3$, $1_4$ and $1_5$ in up to a maximum of five housing positions $P_1$, $P_2$, $P_3$, $P_4$ and $P_5$, respectively, and a cartridge detector 3 for detecting the possible presence of the disc cartridges in the housing positions $P_1$, $P_2$, $P_3$, $P_4$ and $P_5$ o the stocker 2 by detectors $3_1$, $3_2$, $3_3$, $3_4$ and $3_5$, respectively. The disc recording and/or reproducing apparatus includes a recording and/or reproducing unit 20 for recording and/or reproducing information signals on or from one of the disc cartridges $1_1$, $1_2$, $1_3$, $1_4$ and $1_5$ in the stocker 2 desired by the user. This operation of recording and/or reproducing information signals is referred to hereinafter as accessing except if special demarcation is needed. The disc recording and/or reproducing apparatus includes a transporting unit 4 configured for taking out a desired disc cartridge from the stocker 2 for loading the disc cartridge on the recording and/or reproducing unit 20 and for taking out the disc cartridge from the recording and/or reproducing unit 20 or transporting the disc cartridge thus taken out to the stocker 2. The disc recording and/or reproducing apparatus includes a system control circuit 40 for restoring the disc cartridge being accessed to the housing position detected to be devoid of the medium by the cartridge detector 3 if, when restoring the disc cartridge being accessed by the recording and/or reproducing unit 20 to the stocker 2, the cartridge detector 3 outputs a detection signal that the original housing position is occupied by a disc cartridge.

The housing positions $P_1$ to $P_5$ are arranged so that the five disc cartridges $1_1$ to $1_5$ are stacked in the same orientation.

The cartridge detector 3 detects possible presence of the disc cartridges in the housing positions $P_1$ to $P_5$ by mechanical switches using the detectors $3_1$ to $3_5$, respectively.

The transporting unit 4 includes a slider 4a for pulling out a desired disc cartridge from its housing position and for pulling the disc cartridge to the housing position, and an elevator 4b for holding and uplifting and lowering a desired disc cartridge along with the slider 4a. The slider 4a is moved by a slider movement motor ($M_1$) 5 via a gearing, not shown, in a direction indicated by arrow L and in the direction indicated by arrow R. The elevator 4b is moved in the directions indicated by arrows U and D by an elevator movement motor ($M_2$) 6 via a gear, not shown, meshing with a rack gear formed at an end of a rack plate 7. Within the elevator 4b, there is provided a slider pull-in position detection switch for detecting the pull-in of the slider 4a into the stocker 2. The switch outputs an on-signal to the system control circuit 40 to intimate that the slider 4a has been positioned in the slider 4a. Within the elevator 4b, there is also provided a slider pullout position detection switch 9 for detecting the pull-out of the slider 4a towards the recording and/or reproducing unit 20. This switch outputs an on-signal to the system control circuit 40 to intimate that the slider 4a has been positioned towards the recording and/or reproducing unit 20.

The position of the elevator 4b is detected by an elevator position detection switch 10 configured for detecting the position of the elevator 4b based on changes in light transmitted through a slit bored in the rack late 7 to reach two sets of light-receiving elements. The detection signal is sent to the system control circuit 40. During the time a desired disc cartridge is accessed by the recording and/or reproducing unit 20 or the accessing by the present apparatus is halted regularly, the elevator 4b is at the lowermost position termed a home position, with the slider 4a having been moved to the recording and/or reproducing unit 20 or to the stocker 2. It is a home position switch 11 that detects the elevator 4b in this home position and outputs a detection signal to the system control circuit 40.

The recording and/or reproducing unit 20 includes an optical head 21 clamped when, with the disc cartridge having been pulled out by the slider 4a, the elevator 4b is lowered to the home position, and which illuminates a reproducing or recording laser light beam to a disc run in rotation by a spindle motor 25, and a magnetic field modulation head 22 for modulating the magnetic field in the illuminated position by the recording laser light beam from the optical head 21. The recording and/or reproducing unit 20 also includes a servo circuit 26 for computing detection signals obtained by a photodetector of the optical head 21 for moving the position of the illuminating spot on the disc along the optical axis or along the disc radius for effecting focusing servo, tracking servo or servo for the spindle motor 25. The recording and/or reproducing unit 20 also includes an encoder/decoder 27 for decoding the information signals recorded on the disc using a detection signal obtained from the photodetector to output the decoded signal at an output terminal 28 and for encoding the information signals entering an input terminal 29 for supplying the encoded signal to a magnetic field modulating head 22. The recording and/or reproducing unit 20 also includes a recording/reproducing unit control circuit 30 for controlling the recording and/or reproducing unit 20 in its entirety inclusive of the encoder/decoder 27 and a RAM 31 for holding the user management information of the disc or the audio data. The magnetic field modulating head 22 is held in the state of having been perpendicularly rotated on the disc by a rotating mechanism 23 driven by a rotating motor ($M_3$) 24 except during recording.

The reproducing operation for information signals by the recording and/or reproducing unit 20 is now explained. If the desired disc is clamped on the disc table, and the objective lens of the optical head 21 is moved by a thread motor, not shown, to a position proximate to the disc, the spindle motor 25 is started for running the disc in rotation.

The optical head 21 then illuminate a laser light beam on a target track on the disc via objective lens to acquire an output signal by a detector from the reflected light. This output signal of the optical head 21 is supplied to the servo circuit 26 and to the encoder/decoder 27.

The servo circuit 26 is made up of for example, a focusing servo control circuit, a tracking servo control circuit and a thread servo control circuit. The encoder/decoder 27 computes detection signals from the optical head 21 to derive a playback output signal which is processed with decoding for deinterleaving or error correction. The decoded data is temporarily written in the RAM 31 operating as a buffer memory controlled by the recording/reproducing control circuit 30, and subsequently read out and outputted at the output terminal 28.

The processing for recording information signals on the disc by the recording and/or reproducing unit 20 is now explained. The information signals entering the input terminal 29 are encoded or corrected for errors by the encoder/decoder 27 so as to be supplied thence to the magnetic field modulating head 22. The magnetic field modulating head 22 then generates a perpendicular magnetic field modulated in accordance with the encoder output signal to apply the generated magnetic field to the magneto-optical disc 65. Since the optical head 21 then illuminates the recording laser light beam to the disc so that the signal recording surface of the optical head 21 is lowered in coercivity to permit the magnetic field modulating head 22 to modulate readily the direction of magnetization in accordance with the information signals.

Figure 6:
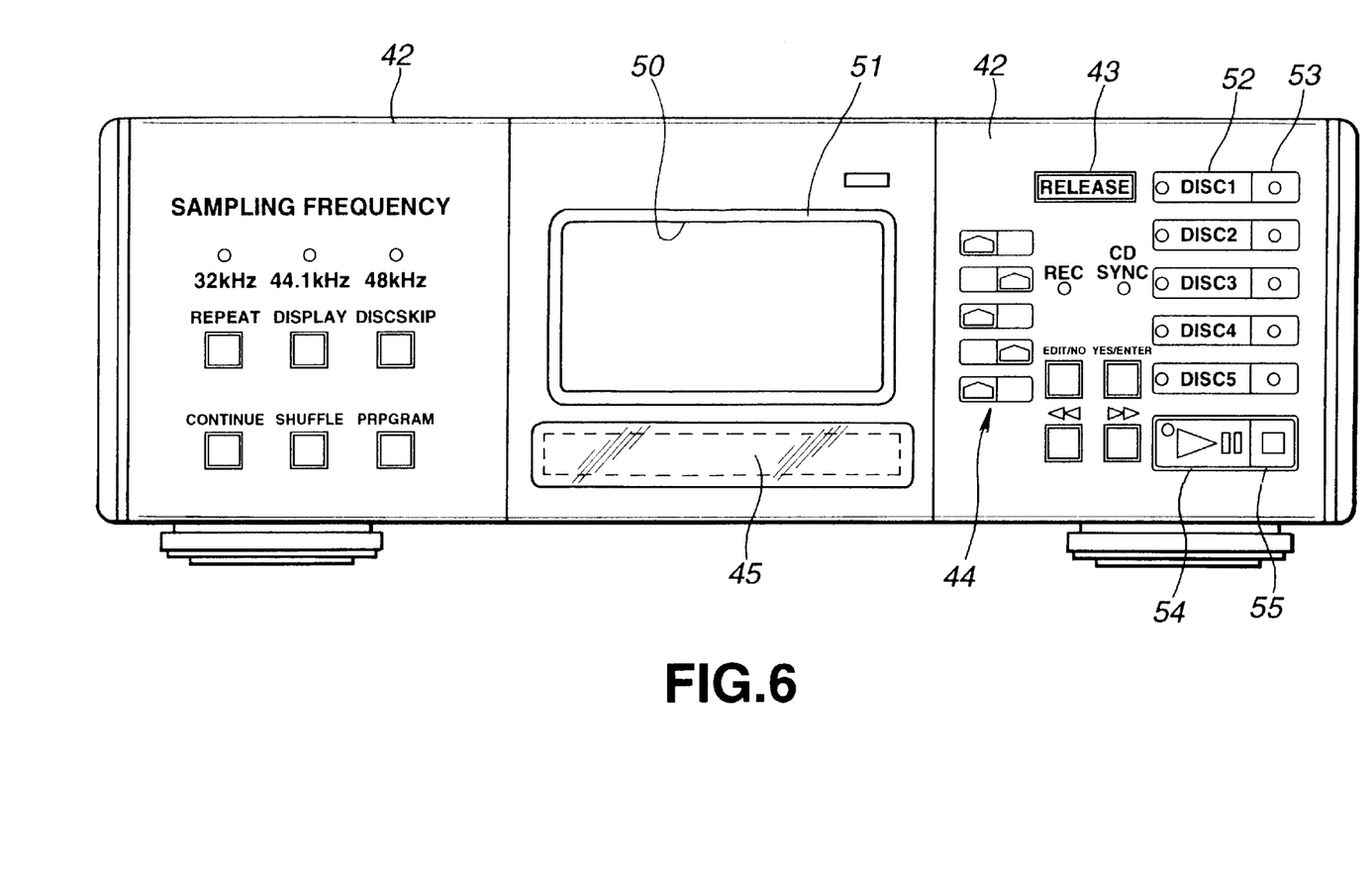
FIG. 6 is a front view showing an example of a disc recording and/or reproducing unit of the disc recording and/or reproducing device embodying the present invention.

FIG. 6 shows the appearance of ta recording and/or reproducing unit 130 shown in FIG. 5.

When the user acts on operating switches provided on an operating panel 42 shown in FIG. 6, the system control circuit 40 causes the transporting unit 4 to take out a desired disc cartridge from the stocker 2 to clamp the disc on the recording and/or reproducing unit 20 to cause the recording/reproducing unit control circuit 30 to access the recording and/or reproducing unit 20.

The operating panel 42 includes a release key 43, an ejection key 44, and other keys shown in FIG. 6, namely a disc selection key 52, a recording selection key 53, a reproducing key 54 and a stop key 55. The release key 43 is used for returning the disc cartridge being accessed by the recording and/or reproducing unit 20 to a pre-set housing position in the stocker 2. In particular, if desired to take out the disc cartridge from the pres-set housing position in the stocker 2, the user acts on the ejection key 44 provided in the vicinity of the associated housing position.

The operating panel 42 includes a sampling frequency indicating unit (SAMPLING FREQUENCY) for indicating the sampling frequency of the disc cartridge being accessed, such as 32 kHz, 44.1 kHz or 48 kHz, a repeat key (REPEAT) for repeating the accessing by the recording and/or reproducing unit 20, a display key (DISPLAY) for a display unit 45 for displaying the name of the disc cartridge being accessed or a track name, and a skip key (DISC SKIP) used for accessing a disc cartridge other than the currently accessed disc cartridge. The operating panel 42 also includes a continue key (CONTINUE) for continuing the accessing, a shuffle key (SHUFFLE) for effecting shuffle reproduction and a program key (PROGRAM) for effecting program recording/reproduction.

Figure 7:
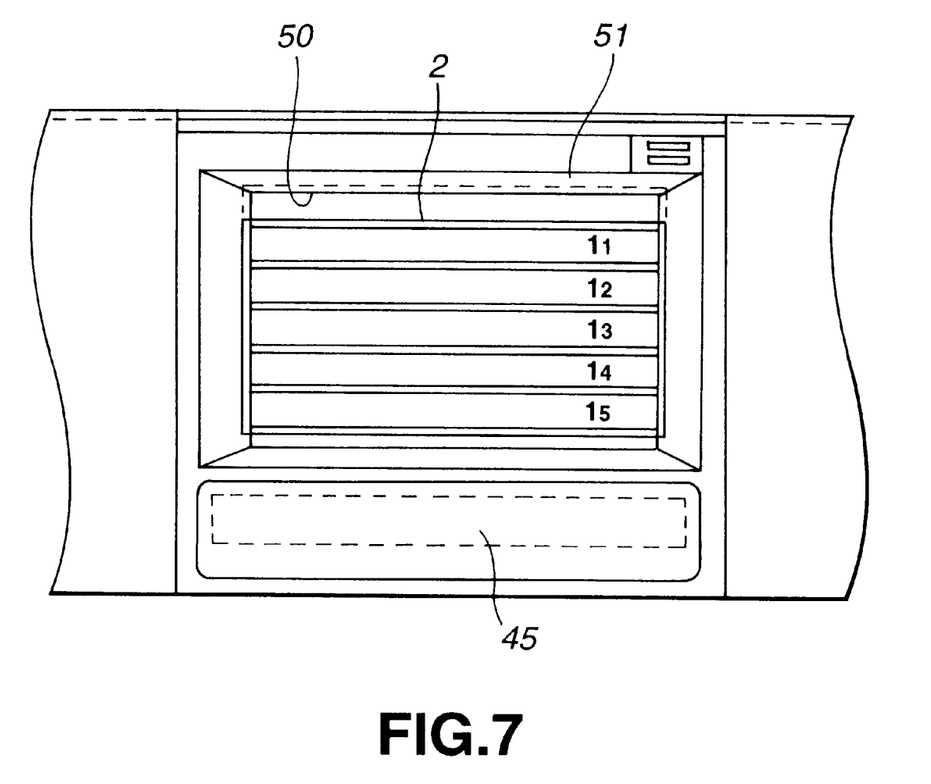
FIG. 7 shows an example of a disc housing section of the disc recording and/or reproducing unit of the disc recording and/or reproducing device.

Centrally of the operating panel 42, there is provided a lid 51 formed with a transparent window 50 for the stocker which permits the disc cartridges stored in the stocker 2 to be visually recognized from outside, as shown in FIG. 7. Thus, the user can recognize the names of albums stated on label surfaces on the head portions of the five disc cartridges $1_1$ to $1_5$ even with the lid 51 closed. Below the transparent window 50 for the stocker, there is formed a transparent window for the display unit 45. If desired to insert or eject the disc cartridge to or from the disc cartridge, it suffices to open the lid 50 as shown in FIG. 7.

The operation of continuously recording information signals, such as audio signals of a broadcast program received by the tuner/timer unit 120, across the five magneto-optical discs housed within the disc recording and/or reproducing unit 130, is specifically explained with reference to FIGS. 1 to 8.

Figure 8:
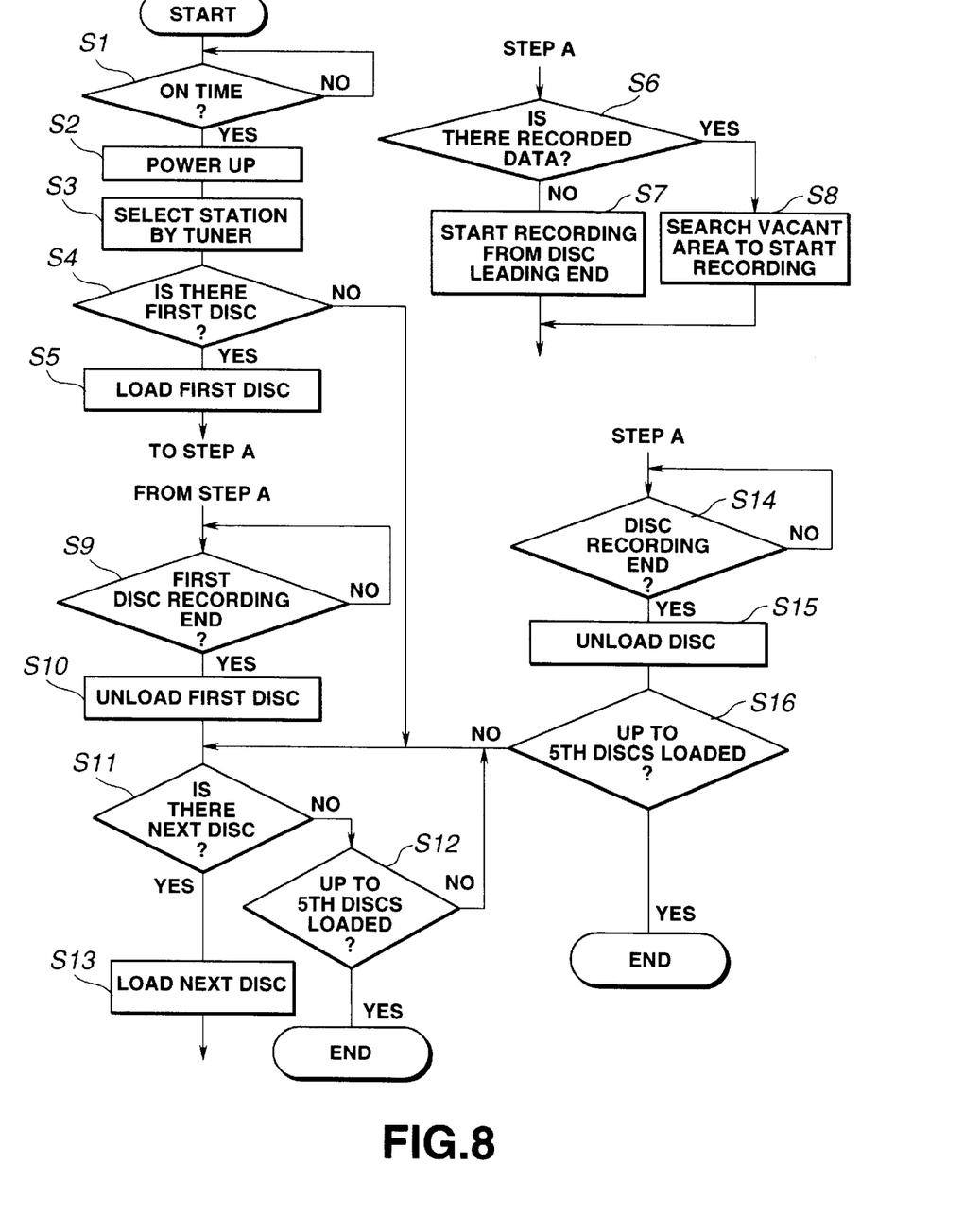
FIG. 8 is a flow chart showing an example of the operation of the disc recording and/or reproducing device.

FIG. 8 is a flowchart for illustrating an example of the operation of the recording and/or reproducing apparatus shown in FIG. 1.

It is assumed that the power source is turned off and that the power source has not been turned of manually before the power source is turned on by the tuner/timer unit 120. Meanwhile, in the tuner/timer unit 120, only a timepiece unit 124 is turned on at all times with the minor current.

At step S1, the timer unit 124 monitors whether or not the current time is the time the power source is turned on for the broadcast program for timer recording (timer-on time). When the time is the timer-on time as set, processing transfers to step S2.

At step S2, the timepiece unit 124 of the tuner/timer unit 120 sends a control signals via a control circuit 121 to a control circuit 111 of the amplifier/controller 110 to turn on the power of the entire disc recording and/or reproducing system.

At step S3, the tuner unit 122, the power for which is now turned on, reads out the information for timer recoding or the station selection setting information stored in the RAM 123 in order to select the station for the program set for timer recording based on the setting information. The control circuit 121 sends the recording start signal to a control circuit 131 of the disc recording/reproducing unit 130. The recording start signal may also be sent by the control circuit 111 of the amplifier/controller 110.

The control circuit 131 of the disc recording and/or reproducing unit 130 controls the starting of recording on reception of the recording start signal. It is checked at step S4 by the cartridge detector 3 of FIG. 5 whether or not the first disc has been housed in the stocker of the disc housing unit 134a. If the first disc has been stored in the stocker, processing transfers to step S5. If otherwise, processing transfers to step S11 as later explained.

At step S5, the disc transporting unit 134b takes out the first disc from the stocker to load it on a spindle of rotationally driving the disc of the recording/reproducing unit 134c by way of loading. At this time, the recording/reproducing unit 134c detects the mistaken recording inhibiting potion 64b, holding the loaded disc, by a detection switch. If the detected results indicate recording possible state, processing transfers to next steps as now explained.

At step S6, it is checked whether or not there is the recorded information signal on the first disc loaded and clamped. If there is no recorded information signal, processing transfers to step S7 to start recording from the leading end of the first signal recording area of the disc. If there is the recorded information, processing transfers to step S8 to search for a vacant area in the first signal recording area of the disc to make recording in the vacant area. This vacant area is detected by having reference to the information on the recording contents of the information signal recorded in the first signal recording area of the disc recorded in the second signal recording area, the aforementioned table-of-contents information or the so-called TOC information. This TOC information is recorded in a pre-set area such as the inner most or outer most rim of the disc and is usually read out and written on the RAM when the disc is loaded on the recording/reproducing unit 134c. The contents of the TOC information, usually includes the number of musical airs (file number), name of tunes (file number), start and end addresses on the disc (tracks or sector addresses), playing time (file size) and addresses or sizes of the vacant areas on the medium, depending on standards and specifications. From any of the steps S7 or S8, processing transfers to step slider pullout position detection switch 9.

The process from step S6 to S9, that is the steps of recognizing whether or not there is the recorded information on the disc, is used later again, so that these steps are termed a process A.

At step S9, it is checked whether or not recording on the first disc has come to a close. Judgment as to whether or not recording on a dis has come to a close is given depending on whether or not the information signals have been recorded up to the last address of the first signal recording area of the disc. If the recording on the first disc has come to a close, processing transfers to step S10. At this time, the TOC information corresponding to the information signals recorded in the first signal recording area by the recording which has just been made is recorded in the signal recording area of the first disc. After recording the TOC information, processing transfers to step S10.

At step S10, the disc transporting unit 134b effects unloading of restoring the first disc, on which recording has come to a close, to the stocker, and a disc exchanging operation.

At step S11, it is checked whether or not the next disc for recording, herein the second disc, has been stored in the stocker. If the next disc is stored in the stocker, processing transfers to step S13. If the next disc has not been stored in the stocker, processing transfers to step S12.

At step S12, it is checked whether or not the loading up to the fifth disc has been made and recording on all of the five discs has come to a close. If the loading has not been done up to the fifth disc, processing reverts to step S11 to re-check whether or not the next disc, herein the third disc, has been stored in the stocker. If loading up to the fifth disc and recording on the discs up to the fifth disc come to a close, the recording operation is terminated. The control circuit 131 determines whether the loading up to the fifth disc has come to a close based on the detecting operation from the cartridge detector 3.

If the next disc has been found at step S11 to be stored in the stocker, processing transfers to step S13, where the disc transporting unit 134b performs disc loading, that is it takes out the next disc from the stocker to load the disc on the disc driving spindle motor of the disc recording/reproducing unit 134c to set up a recordable state.

Then, processing transfers to the process A of steps S6 to S8 to check whether or not there is the recorded information signal on the loaded next disc. If there is no recorded information signal, recording is started from the leading end of the signal recording area of the disc. If there is the recorded information signal, search is made for a vacant area of the disc in which to make the recording. In any case, processing transfers to step S14 as later explained.

At step S14, it is checked whether or not recording on the second and the following disc(s) has come to a close. If recording on the disc being monitored comes to a close, processing transfers to step S15.

At step S15, the disc transporting unit 134b restores the disc, on which recording has come to a close, to the stocker, by way of disc unloading.

At step S16, it is checked whether or not the discs up to the fifth disc have been loaded, that is whether or not recording on the five discs has come to a close. If the discs up to the fifth disc have not been loaded, processing reverts to step S11 to re-check whether or not the next disc, for example, the third disc, has been stored in the stocker. If the discs up to the fifth disc have been loaded, that is recording on the discs has come to a close, the recording operation is terminated.

If, as a result of detection by the detection switch of the recording/reproducing unit 134c of the mistaken recording inhibiting potion 64b, recording of the information signals on the loaded disc is found to be impossible, there occurs a processing similar to that when the disc cartridge is not loaded on the stocker.

By the above sequence of operations, it is possible to record information signals, such as audio signals, substantially continuously on the five discs.

Meanwhile, the time of, for example, ten seconds, has to elapse since the disc transporting unit 134b takes out the disc hosed in the stocker until the disc is clamped on the spindle to start the recording. Thus, the input information signals cannot be recorded during the disc exchange time. This problem can be addressed by occasionally increasing the capacity of the RAM 31 of FIG. 5 (shock-proof memory) in which to store the information signals continuing during this 10-second time interval, and by writing the stored information signals on the next disc.

If five non-recorded blank discs are used, recording can be made sequentially from the leading end up to the trailing end of the recording area of each disc such that continuous recording over a prolonged time of 370 minutes can be made using five discs each having a longest recording time of 74 minutes. If partially recorded discs are used, search is made for a vacant area in each disc to effect continuous recording across plural discs, so that recording can be made from one vacant area to another of each disc to contribute to effective utilization of vacant areas of the partially used discs.

Another operation of the disc recording and/or reproducing apparatus according to the present invention is now explained.

Figure 9:
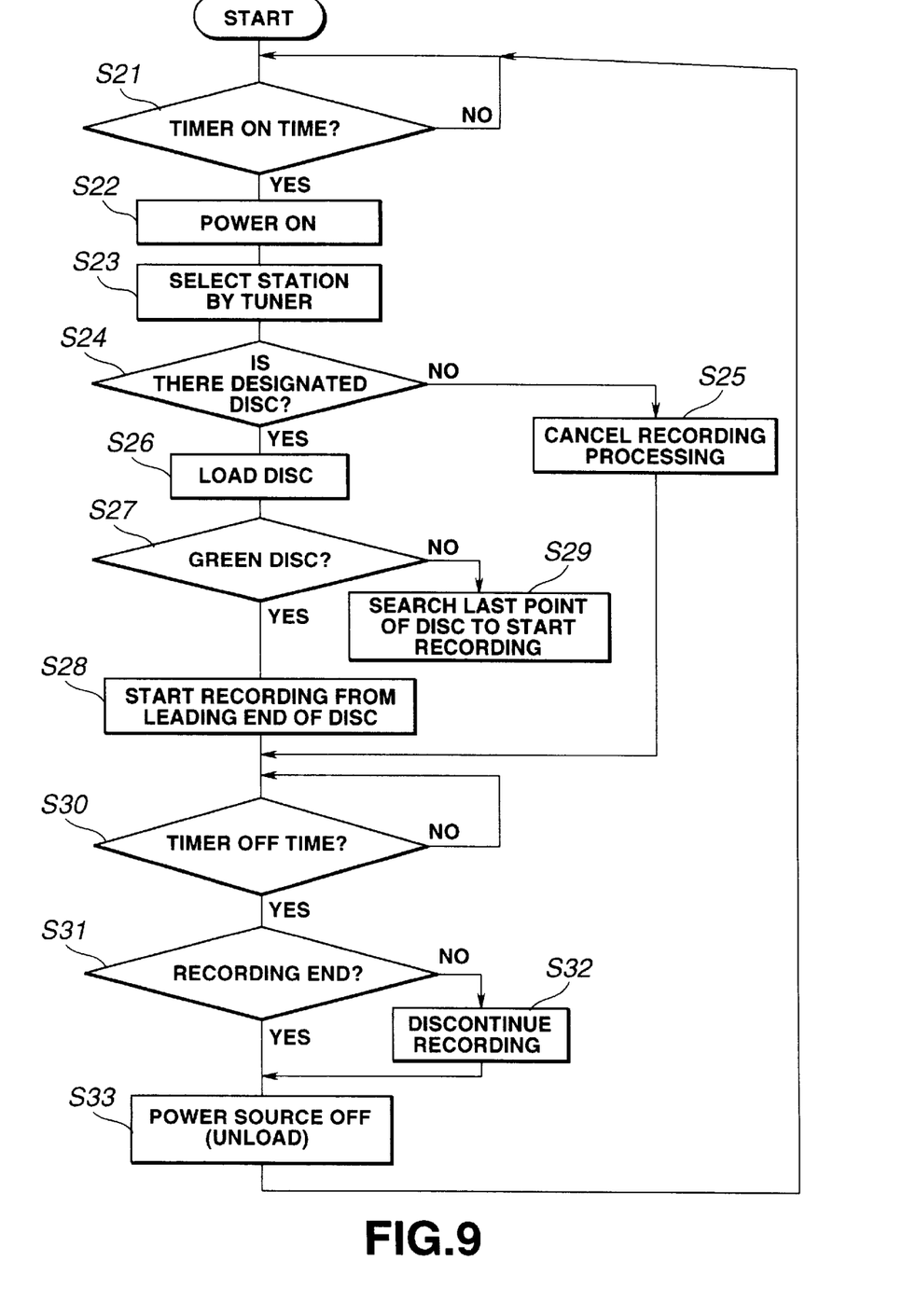
FIG. 9 is a flow chart showing another example of the operation of the disc recording and/or reproducing device.

FIG. 9 shows a flowchart for illustrating this other operation of the disc recording and/or reproducing apparatus shown in FIG. 1.

Referring to FIG. 9, this operation of the disc recording and/or reproducing apparatus is specifically explained, taking an example of the case of separately recording information signals of a plurality of, for example, five broadcast programs, received by the tuner/timer unit 120, on five magneto-optical discs housed in the disc recording and/or reproducing unit 130.

It is assumed that the power source of the disc recording and/or reproducing apparatus is turned off, that is the power source of the apparatus is manually turned off before the power source is turned on by the tuner/timer unit 120.

At step S21, the timepiece unit 124 monitors whether or not the time is the time set for turning the power source on for the program for timer recording (timer-on time). If the time is the timer-on time, processing transfers to step S22.

At step S22, the timepiece unit 124 of the tuner/timer unit 120 sends a control signal from the timepiece unit 124 of the tuner/timer unit 120 via control circuit 121 to the control circuit 111 of the amplifier/controller 110 in order to turn on the power source of the disc recording and/or reproducing apparatus in its entirety.

At step S23, the tuner 122, the power source of which has been turned on, reads out the timer program recording information or the station selecting setting information stored in the RAM 123 to select the station of the program for timer recording based on the setting information. The control circuit 121 sends the recording start signal to the control circuit 131 of the disc recording/reproducing unit 130. The recording start signal can also be sent by the control circuit 111 of the amplifier/controller 110.

At step S24, the control circuit 131 of the disc recording/ reproducing unit 130 receives a recording start signal, inclusive of the disc number, from the tuner/timer unit 120, in order to check whether or not the designated disc has been stored in the stocker of the disc housing section 134*a*, more accurately, whether or not the disc has been stored in the designated housing position of the stocker. This check is by the cartridge detector 3 shown in FIG. 5. If the designated disc is housed in the stocker, processing transfers to step S26 and, if otherwise, to S25. A similar processing operation is performed if the result of detection of the mistaken recording inhibiting portion 64*b* has indicated that the recording of the information signals on the disc housed in the disc cartridge is inhibited.

At step S25, the recording operation is canceled, before processing transfers to step S30.

At step S26, the disc transporting unit 134*b* takes out the designated disc from the stocker and loads the disc on the spindle adapted for rotationally driving the disc of the recording/reproducing unit 134*c* to set a recordable state.

At step S27, it is checked whether or not there is the recorded information signal on the loaded disc. If there is no recorded information signal, processing transfers to step S28 to start recording from the leading end of the signal recording area of the disc. If there is any recorded signal, processing transfers to step S29 to search a vacant area of the disc to effect the recording on the vacant area so found. This vacant area is detected by having reference to the information on the information signals on the disc, that is the TOC information which is the information pertinent to the recording contents. After any of the steps S27 and S28, processing transfers to step S30.

At step S30, it is monitored whether or not the time is the power off setting timing for the program currently received. If the time is the set time (timer off time), processing transfers to step S31. Although not shown here, it may be an occurrence that the disc recording/reproducing unit 130 terminates the recording when the disc is full before the timer off time. At this time, the TOC information for the information signals recorded in the first signal recording area by the current recording operation is updated and recorded in the second signal recording area of the disc, as in the operation of the previous step S9.

At step S31, it is checked whether or not the recording on the disc has come to a close. If the recording on the disc has already come to a close, processing transfers to step S33 and, if the recording is still going on, recording on the disc is discontinued at step S32 to proceed to step S33.

At step S33, a control signal is sent from the timepiece unit 124 of the tuner/timer unit 120 via control circuit 121 to the control circuit 111 of the amplifier/controller 110 to turn off the power source of the disc recording and/or reproducing apparatus in its entirety. At this time, the disc recording/reproducing unit 130 causes the disc transporting unit 134*b* to restore the disc to the stocker by way of disc unloading.

Then, processing reverts to step S21 to monitor whether or not the time is the next set time of turning off the power source. If the time is the next set time of turning off the power source, the operation of recording the output signals from the tuner on the disc is performed repeatedly based on the above-described sequence of operations.

By the above sequence operations, different information signals, such as audio signals of different broadcast programs, can be recorded on the five discs.

Moreover, information signals an be recorded by the disc recording/reproducing unit 130 on plural recording mediums continuously or separately for the respective mediums at the same time as the plural recording mediums stored in the stocker are exchanged, thus realizing various recording forms in combination with, for example, compact disc exchanging/reproducing apparatus.

Although the rewritable disc-shaped recording medium in the above-described embodiment is the magneto-optical disc, a phase change type optical disc or a magnetic disc may also be used as the rewritable disc-shaped recording medium. Moreover, the present invention is not limited to the disc-shaped recording medium and may be extensively applied in conjunction with a recording medium housed in a stocker and which can be exchanged by a medium exchange mechanism, such as a digital audio tape.

Industrial Applicability

With the recording apparatus according to the present invention, input information signals can be sequentially recorded on the plural recording mediums for sequentially recording the information signals, as the recording mediums are exchanged, for achieving substantially long-time recording. By using recordable disc-shaped recording mediums as the mediums, searching vacant unrecorded areas of the recording mediums based on the information pertinent to the recording contents, such as the TOC information, and sequentially recording the information signals in the vacant areas, thus found, continuous recording across plural recording mediums can be achieved using semi-used recording mediums without erasing the recorded information signals on these semi-used recording mediums.

We claim:

1. A recording apparatus comprising:

a tuner;

a storage unit for holding in memory timer information concerning at least a broadcast reception start time of said tuner and a broadcast reception end time of said tuner;

a timer;

a housing section for holding a plurality of recording media;

a recording unit for effecting recording on a recording medium taken out from the housing section; and a controller for controlling the operation of said tuner and the recording unit based on an output signal from said timer and timer information held in memory in said storage unit;

said controller also for comparing an output signal from the timer and the broadcast reception start time, causing said recording unit to start recording of an output signal from said tuner on a recording medium taken out from the housing section, and causing the recording unit to terminate the recording of the output signal from said tuner based on the results of a comparison of an output signal of the timer and the broadcast reception end time; and said controller also for judging whether or not signals are already recorded on the recording medium taken out from the housing section and controlling the recording start position of the output signal on the recording medium by said recording unit based on results of the judgment.

2. The recording apparatus as claimed in claim 1 wherein, if said controller judges that signals are already recorded on the recording medium taken out from said housing section, the controller causes the recording unit to record an output signal from the tuner as from the recording end position of the previous recording on the recording medium.

3. The recording apparatus as claimed in claim 1 wherein, if said controller judges that signals are not already recorded on the recording medium taken out from said housing section, the controller causes the recording unit to record an output signal from the tuner in continuation to the recording start position of the recording medium.

4. The recording apparatus as claimed in claim 1 wherein, after an end of recording of the output signal from the tuner on the recording medium taken out from the housing section, said controller causes recording media held in said housing section to be sequentially taken out from the housing section and causes the recording unit to continue the recording operation thereon.

5. The recording apparatus as claimed in claim 4 wherein said housing section has a plurality of housing sites in which to hold the plurality of recording media and wherein the apparatus includes a detection unit for detecting on which of the housing sites the recording media are held.

6. The recording apparatus as claimed in claim 5 wherein said controller controls the recording operation of the recording unit based on the results of detection by said detection unit.

7. The recording apparatus as claimed in claim 6 further comprising:

a transporting unit for taking out a recording medium from the housing section to transport it to said recording unit, said controller controlling the operation of the transporting unit based on the results of detection from said detection unit.

8. The recording apparatus as claimed in claim 1 further comprising:

a plurality of tuners; and wherein said storage unit holds in memory the timer information concerning the broadcast reception start time and the broadcast reception end time by the plurality of tuners and a plurality of items of reception information concerning the broadcast stations received by the plurality of tuners, said storage unit also holding in memory medium information as to on which of the recording media housed in the housing section a broadcast received by a tuner is to be recorded, said controller controlling the plurality of tuners by the reception information read out from said storage unit, said controller causing the recording medium designated by the medium information to be taken out from the housing section to record the output signal from the tuner thereon.

9. The recording apparatus as claimed in claim 8 wherein, if said controller judges that signals are already recorded on the recording medium taken out from said housing section, the controller causes the recording unit to record an output signal from the tuner in continuation to the recording end position of the previous recording on the recording medium.

10. The recording apparatus as claimed in claim 8 wherein, if said controller judges that signals are not already recorded on the recording medium taken out from said housing section, the controller causes the recording unit to record an output signal from the tuner in continuation to the recording start position of the recording medium.

11. The recording apparatus as claimed in claim 8 wherein said housing section has a plurality of housing sites in which to hold the plurality of recording media and the apparatus includes a detection unit for detecting on which of the housing sites the recording media are held.

12. The recording apparatus as claimed in claim 11 wherein said controller controls the recording operation of the recording unit based on the results of detection by said detection unit.

13. The recording apparatus as claimed in claim 6 further comprising:

a transporting unit for taking out a recording medium from the housing section to transport it to said recording unit, said controller controlling the operation of the transporting unit based on the results of detection from said detection unit.

14. A recording apparatus for a recording medium having a first recording area in which to record signals and a second recording area in which to record the table-of-contents information concerning signals recorded in the first recording area, comprising:

a tuner;

a storage unit for holding in memory timer information concerning at least a broadcast reception start time of said tuner and a broadcast reception end time of said tuner;

a timer;

a housing section for holding a plurality of recording media;

a recording unit for recording an output signal from the tuner on a recording medium taken out from the housing section; and a controller for controlling the operation of said tuner and the recording unit based on an output signal from said timer and the timer information held in memory in said storage unit;

said controller for controlling the reception operation of the tuner based on the timer information from said storage unit and comparing the output signal from the timer to the broadcast reception start time, said controller causing a sole recording medium to be taken out from the housing section based on the results of the comparing, said controller also causing the recording unit to start recording the output signal of said tuner in a vacant recording area in the first recording area of the recording medium taken out from the housing section, said controller also causing the recording unit to terminate recording of the output signal based on the results of a comparison of the timer output signal to the broadcast reception end time; and said controller also for judging whether or not signals are already recorded on the recording medium taken out from the housing section and controlling the recording start position of the output signal on the recording medium by said recording unit based on results of the judgment.

15. The recording apparatus as claimed in claim 14 wherein, if said controller judges that signals are already recorded on the recording medium taken out from said housing section, the controller causes the recording unit to record an output signal from the tuner in continuation to the recording end position of the previous recording on the recording medium.

16. The recording apparatus as claimed in claim 14 wherein, if said controller judges that signals are not already recorded on the recording medium taken out from said housing section, the controller causes the recording unit to record an output signal from the tuner in continuation to the recording start position of the recording medium.

17. The recording apparatus as claimed in claim 14 wherein, after an end of recording of the output signal on the recording medium taken out from the housing section, said controller causes recording media held in said housing section to be sequentially taken out from the housing section and causes the recording unit to continue the recording operation thereon.

18. The recording apparatus as claimed in claim 17 wherein said housing section has a plurality of housing sites in which to hold the plurality of recording media and wherein the apparatus includes a detection unit for detecting on which of the housing sites the recording media are held.

19. The recording apparatus as claimed in claim 18 wherein said controller controls the recording operation of the recording unit based on the results of detection by said detection unit.

20. The recording apparatus as claimed in claim 19 further comprising:

a transporting unit for taking out a recording medium from the housing section to transport it to said recording unit, said controller controlling the operation of the transporting unit based on the results of detection from said detection unit.

21. The recording apparatus as claimed in claim 14 further including:

a plurality of tuners; and wherein said storage unit holds in memory timer information concerning the broadcast reception start time and the broadcast reception end time by the plurality of tuners and a plurality of items of reception information concerning broadcasting stations received by the plurality of tuners, said storage unit also holding in memory medium information as to on which of recording media housed in the housing section a broadcast received by a tuner is to be recorded, said controller controlling the plurality of tuners by the reception information read out from said storage unit, said controller causing the recording medium designated by the medium information to be taken out from the housing section to record the output signal from the tuner thereon.

22. The recording apparatus as claimed in claim 14 wherein said controller judges whether or not signals are already recorded on a recording medium taken out from the housing section, based on the table-of-contents information recorded in the second recording area.

23. The recording apparatus as claimed in claim 22 wherein, if said controller judges that signals are already recorded on the recording medium taken out from said housing section, the controller causes the recording unit to record an output signal from the tuner in continuation to the recording end position of the previous recording on the recording medium taken out from the recording section.

24. The recording apparatus as claimed in claim 22 wherein, if said controller judges that signals are not already recorded on the recording medium taken out from said housing section, the controller causes the recording unit to record an output signal from the tuner in continuation to the recording start position of the recording medium.

25. The recording apparatus as claimed in claim 21 wherein, if recording of output signals from the tuner on the recording medium taken out from the housing section comes to a close, the controller causes the recording media held in the housing section to be taken out sequentially and causes the recording unit to continue the recording operation until the output signal of the timer coincides with the broadcast reception end time.

26. The recording apparatus as claimed in claim 25 wherein said housing section has a plurality of housing sites in which to hold the plurality of recording media and wherein the apparatus includes a detection unit for detecting on which of the housing sites the recording media are held.

27. The recording apparatus as claimed in claim 26 wherein said controller controls the recording operation of the recording unit based on the results of detection by said detection unit.

28. The recording apparatus claimed in claim 26 further comprising:

a transporting unit for taking out a recording medium from the housing section for transport to said recording unit, said controller controlling the operation of the transporting unit based on the results of detection from said detection unit.

* * * * *